3,000,919
PRODUCING ORGANIC DERIVATIVES OF ALUMINUM
Georges Wetroff, Le Thillay, and Emile Trebillon, Paris, France, assignors to Pechiney, Compagnie de Produits Chimiques et Electrometallurgiques, Paris, France
Filed Nov. 28, 1958, Ser. No. 777,044
Claims priority, application France Dec. 3, 1957
20 Claims. (Cl. 260—448)

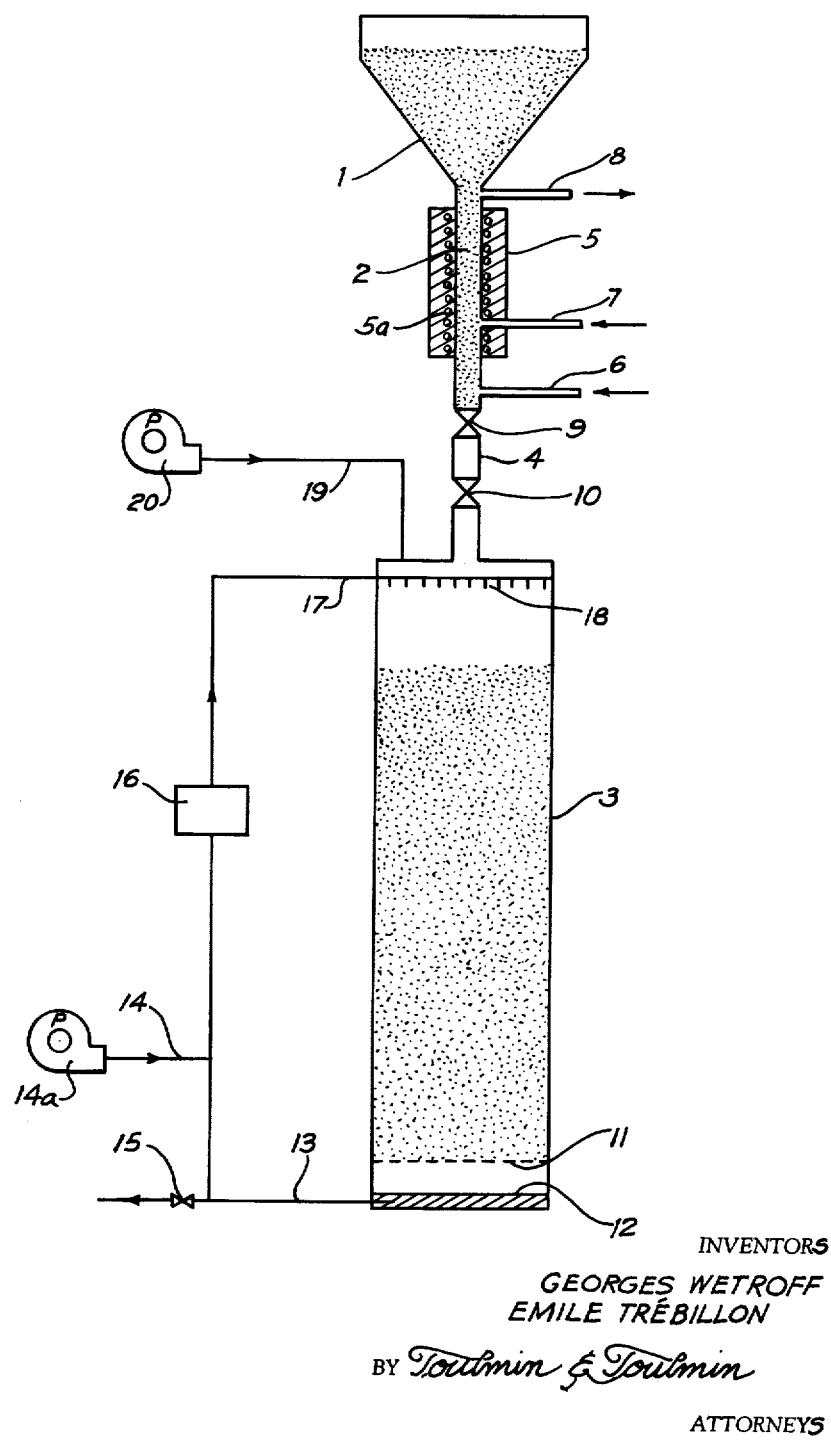

This invention relates to a process for producing organo-aluminum compounds, and, more particularly, an improved treatment of aluminum preparatory to the production of metallo-organic compounds therefrom.

The production of organo-aluminum compounds often requires a rather complicated and critical preparation of the metal to be used.

The commercially available aluminum consisting of lumps, pieces, pellets, or shot, or of filing, or chips, is always covered by a usually oxidic and sometimes carburic superficial layer of great toughness which layer prevents reaction of the metal with the conventionally used reactants in the formation of aluminum-organic compounds, such as olefins and hydrogen. Therefore, this layer has to be removed, thereby "activating" the aluminum metal.

In the past, this "activation" was effected in the most economical manner with the aid of halogens or halogen-containing substances present in mixture with the other above mentioned reagents. However, the resulting organo-aluminum compounds are always contaminated with halogenated byproducts, the removal of which requires complicated elimination treatments.

More recently, larger amounts of high purity alkyl aluminum compounds are required in the low-pressure catalytic production of polyethylene and related plastic materials; therefore, in the production of aluminum alkyls, various processes of pretreating the starting aluminum are used in the art, all of which, however, involve a considerable consumption of energy, and in addition complicate the process by requiring intermediate steps of comminution and/or purification in order to obtain a satisfactory end product.

One of the known processes comprises comminuting a block of aluminum with the aid of a suitable comminuting device, in an atmosphere of an inert gas or while the aluminum block is covered protectively by an organo-aluminum compound. According to another known method, the molten aluminum metal is pulverized in a stream of an inert gas and the metallic particles formed in the gas stream are immediately collected and preserved in their freshly activated state by covering them with an organo-metallic compound.

These known processes which comprise the use of starting aluminum in a very finely divided state are expensive and suffer from the danger of contamination of the activated metal with an important proportion of oxidized metal. Similarly, another known method which consists in heating aluminum at 150° C. with hydrogen in the presence of an organo-aluminum compound, is costly and rather impracticable.

Generally speaking, all hitherto known processes for treating aluminum metal which is to serve in the preparation of organo-aluminum compounds, are not easy to carry out industrially, and, taking everything into account on the one hand involve considerable expense. On the other hand, the growing importance of these compounds as catalysts in the production of polyolefinic plastic materials by the so-called "low-pressure" processes makes it desirable to have the organo-aluminum compounds available in large quantities, high purity, and low production costs.

It is therefore an object of our invention to provide a new process for the production of organo-aluminum compounds on a large scale, with high production rates and wherein the production costs are decisively lowered compared with the known methods, by greatly simplifying the use of industrially produced aluminum as starting materials while still obtaining high purity compounds.

It is another object of the invention to provide for an apparatus of simple construction in which the activation and conversion of commercially available aluminum in grains of relatively large particle size can be effected to obtain directly, in a continuous or discontinuous manner as desired, a high purity organo-aluminum end product.

Toward this end, the new process, according to our invention comprises the steps of (1) Treating as starting material a conventionally produced aluminum metal in the form of granules, pellets or commercially available shot, of varying grain sizes, as well as aluminum filings, chips or lumps of various and irregular shapes and sizes, with an activating agent consisting of one or several halogen-containing substances, preferably an elementary halogen or the corresponding hydrohalic acids, so as to form very thin, superficial centers or layers of an aluminum halide on the surfaces of the particles of the starting material;

(2) Eliminating the formed halide completely, effectively and preferably continuously, by solving or sublimation from the bulk of aluminum particles, thereby leaving behind a highly activated aluminum material, and (3) Reacting the activated aluminum material free from any residual halides, preferably continuously, with an olefin, hydrogen gas and a starting catalyst, being usually a small amount of the organo-aluminum compound to be produced, under pressure and at elevated temperature, thereby obtaining a high purity organo-aluminum compound in large yield rates.

The new process can easily be carried out continuously on an industrial scale and preferably in an apparatus to be described in detail further below.

The process according to the invention brings about an important simplification in the production of organo-aluminum compounds, as it permits the use of the material directly in any of its conventional, commercially available forms. Another important advantage of the new process resides in the fact that no impurities such as a foreign catalyst or other substance, are introduced into the resulting organo-aluminum product. The invention also avoids the use of solvent or other liquids; in particular it becomes unnecessary to comminute the metal or activate the same in any other manner in the presence of an organo-aluminum compound. The new process consumes much lower amounts of energy than the known processes and involves the use of all expensive reagents.

Another advantage of the new process resides in the possibility of obtaining an aluminum of very strong reactivity; thereby it becomes possible to use aluminum shot or chips of relatively large grains; consequently, an apparatus can now be employed in which the reagents are caused to flow continuously through a reactor tower filled with these aluminum grains, the large irregular size of said grains providing for the necessary passages therebetween. Such reactors are particularly suitable for continuously operated plants.

The halogen-containing substances are preferably used in the gaseous and anhydrous states, although they may eventually be used in solution or suspension, for example in a liquid inert against aluminum.

Thus, according to the invention, the aluminum grains or lumps are first activated superficially by attacking the grain surfaces with substances such as chlorine, bromine, iodine, hydrochloric, hydrobromic, or hydroiodic acid, or with mixtures of several of these substances. Halogenated organic substances may also be employed, which contain at least one labilely, i.e. easily removable, bonded halogen in their molecules; such substances are, for instance, tetrachloroethane or tetrabromoethane. Of course, from an economical and industrial point of view, chlorine and hydrochloric acid are the preferred activating agents. Moreover, the volatility of aluminum chloride makes its eliminateion after the attack particularly easy.

According to an important feature of the invention, the halogens and/or the hydrohalic acids, employed for superficially attacking the aluminum, are diluted with an inert gas. This dilution is preferred, because the surfaces of the aluminum particles are attacked uniformly and not excessively. In fact it is known that aluminum, the more finely it is divided, is attacked by halogen containing substances in a rather violent manner. The reaction starts at certain centers and propagates itself through the aluminum mass from a region in which the conversion of the metal to halide is practically total. On the contrary, according to the invention, by diluting the halogen-containing substance with an inert gas, for instance, nitrogen, argon, propane, butane, or the like, the attack is made to extend uniformly and with even intensity over the entire surfaces of the aluminum particles, while it is easy to limit its progress to the surface layers of the metal.

Thus, according to another important feature of the invention, the attack of the halogen or halogen compound on the aluminum is slowed down, kept uniform and rendered progressive by controlling and, if necessary, decreasing the partial pressure of the halogen-containing substance in the gaseous phase. Thus, according to a preferred mode of operation, aluminum is treated with chlorine and/or with hydrochloric acid under a pressure lower than atmospheric, the pressure being such that the attack occurs with a determined velocity; the flow of the activating agent is controlled in order to provide uniform attack throughout the whole aluminum charge.

According to yet another feature of the invention, the inert gas of dilution is applied in a working cycle. Thus, it can be re-used after passing through the aluminum charge, while each time that the inert gas is recirculated into the process, the required amount of fresh activating agent is injected.

The above-listed steps (1) and (2) in the treatment of aluminum with the activating agent, according to the invention may also be conducted in a single stage.

The operation in a single stage consists in working at a temperature at which the aluminum halide formed is volatile enough to be eliminated simultaneously with the attack on the metal taking place; when chlorine or HCl is used as the halogen-containing substance, the single stage operation is performed preferably at a temperature between 300° and 550° C.; the aluminum chloride formed is then completely eliminated by sublimation, and it may be recovered in pulverulent form, directly usable as a chemical byproduct of the process; it is sufficient to cool the gases leaving the charge of aluminum to about 20° to 50° C. to condense the aluminum chloride.

The operation in two stages consists in conducting the attack with the activating agent at a temperature below that at which the aluminum halide formed volatilizes; the halide is then eliminated in the second step, at a higher temperature, or eventually by another treatment.

It is a particular advantage of the process of the invention that it is possible and sufficient to remove, in the form of halide, only small amounts of the metal used. In practice, the proportion of removed metal is of the order of 0.2 to 5% by weight according to the quality of the metal and the shape of the grains or lumps employed; the amount of metal lost as halide for the main purpose of obtaining organo-aluminum compounds also depends on other operative conditions. Good results are obtained when the decrease of weight of aluminum is about 1%.

The aluminum, activated according to the new process described, may be treated with a great variety of organic radicals for the preparation of various organo-aluminic compounds. Thus, for example, trialkyl aluminum or dialkyl-aluminum hydrides may be produced by the reaction, conventional per se, of the activated metal with an alpha-ethylenic hydrocarbon in the presence of hydrogen. These products are easily obtained with the aluminum pretreated according to the invention; and it is now possible to obtain these products from rather coarse shot having for example sizes comprised between 0.1 and 1 mm.; even chips or flakes of about 0.1 mm. thickness may be used.

In contradistinction to the alkylation step of the known processes in which a very fine aluminum powder must be used from which the usually liquid aluminum alkyls can only be separated with difficulty and under considerable losses, the separation of the liquid aluminum alkyls from the remaining aluminum does not present any problem in the process of the invention; in fact, it becomes possible to introduce a large excess of aluminum shot into a reactor tower and to draw off the liquid products formed during the alkylation step, for instance, through a screen at the bottom of the tower containing the aluminum charge.

Consequently the invention also relates to a new device for the preparation of organic derivatives of aluminum. The device consists of a tower reactor charged with aluminum throughout its entire height or at least a considerable part thereof. Means may be provided for sprinkling the upper part of the charge with the reactant substances; on the other hand, means may be provided for introducing gas at the top and/or at the bottom of the tower; the latter has also, at its lower part, means for withdrawing continuously, or in batches, the freshly formed liquid products.

According to a particular feature of the invention, the above described apparatus also comprises an activating column or the like, wherein aluminum is treated with one or more halogen-containing substances in a continuous manner. Means are provided for transferring, in a continuous or discontinuous manner, the activated aluminum from the activating column into the interior of the reactor tower.

A preferred embodiment of the apparatus according to the invention is illustrated, by way of example, in the accompanying drawing, in which reference numeral 1 designates a hopper filled with aluminum shot. Hopper 1 opens into the lower cylindrical column 2 which is surrounded by a furnace 5 containing electrical heating means 5a. Three tubes are laterally connected with this cylindrical part 2, of which tube 6 is an inlet for inert gas, 7 serves for the introduction of the halogen-containing substance, and 8 is an outlet for the aluminum halide formed in column 2 and for excess or waste gases. Sealing lock 4 between valve means 9 and 10 serves for the batchwise transfer of activated aluminum from activating column 2 to a reactor tower 3 in which alkylation or the corresponding reactions to form the desired organo-aluminum compound take place.

When opening valve 10, lock 4 is put in communication with the interior of an autoclave-like tower 3. At the bottom of tower 3, a perforated plate 11 is provided, on which the charge of activated aluminum shot 23 rests. Conduit 13 and valve 15 serve for drawing off the liquid end products 12 which collect at the bottom of tower 3 in the course of the operation. The organic substance having to react with aluminum is introduced through line 14 with the aid of pump 14a; it is transferred to the top of tower 3 by means of pump 16, and through conduit 17 and a sprinkling system such as distributor 18. Conduit 19 serves for the introduction of a gas, such as hydrogen, under the necessary pressure generated in a pump 20.

While the apparatus is in operation, the aluminum shot, stored in hopper 1 falls into the cylindrical column 2 as required; the cylindrical column may be an enameled steel tube. The furnace 5 ensures heating at a temperature comprised between, for example, 300° and 550° C. The shot contacts countercurrently the inert gas which is introduced at 6 and the halogen containing substance coming from 7. Inasmuch as conduit 6 is situated substantially below 7, the shot heated to a temperature well above the sublimation temperature of the aluminum halide formed between tubes 7 and 8 in column 2, no longer contains aluminum halide as it arrives at valve 9, the aluminum halide being completely volatilized within the heated part of the column 2 and being immediately carried away upwardly and through outlet 8 by the constant stream of the inert gas from 6 to 8. By successively actuating the valves 9 and 10, fractions of the activated aluminum shot are introduced into tower 3 through the sealing lock 4, without ever coming into renewed contact with oxygen, moisture or air.

The desired organic compound of aluminum is produced in the interior of tower 3; the shot in the tower being sprinkled by means of distributor 18 with a reagent, for example an olefin. If required, a gas such as hydrogen is introduced via conduit 19. The sprinkling must then not be so strong as to inundate completely the charge of aluminum particles, or hydrogen can no longer reach the particle surfaces. The liquid end product formed flows through the perforated plate 11 at the bottom of the shot charge 23, and accumulates at 12; it is withdrawn via line 13 and valve 15. Thus a perfectly continuous operation may be achieved, the consumption of shot in tower 3 being continuously replenished by batches or even continuous additions of new activated shot via lock 4.

It is possible to operate in such a manner that the gaseous phase, within tower 3, which fills up the spaces between the grains of metal charge 23, is static; alternatively, this phase may be caused to circulate at a controlled rate. When the process of the invention is applied to the particular case of producing trialkyl-aluminum or dialkyl-aluminum hydride, tower 3 is generally operated under a pressure in the order of 80 to 200 kg./cm.$^2$, and preferably between about 100 and 150 kg./cm.$^2$. The most convenient operating temperature lies, in this case, between 110° and 150° C., but it may exceed this limit considerably, and reach for example 200° C., the only consequence being the formation of a small amount of byproducts.

The composition of the endproduct withdrawn through discharge valve 15 can be steered by the rate of flow at which the olefin is introduced through line 14. Above a certain minimum rates which is, for instance, 5 liters per hour in the case of forming triisooctyl aluminum, the final product will consist substantially entirely of trialkyl aluminum.

If the rate of flow of the olefin drops below this minimum value, then due to the resulting excess of hydrogen in the reactor, the final product will be a mixture of aluminum dialkyl hydride and aluminum trialkyl. If the introduction of olefin is interrupted completely, the final product will consist substantially of aluminum dialkyl hydride.

The above-mentioned minimum value will have to be determined from case to case, for it depends on a number of factors, for instance on the temperature prevailing in the tower 3, but also on the grain size and degree of activation of the aluminum shot, the dimensions of the tower and others.

However, the minimum value can be easily determined from case to case by a trial run and controlled during the operation of the apparatus by repeated analysis determining the hydrogen content of the final product extracted through valve 15.

It is always necessary that the aluminum is treated in the reactor, with an olefin and hydrogen in the presence of a catalyst, which is a small amount of preferably the same organo-aluminum compound which is to be produced. In the past, the large surface of the active aluminum required in a catalytic process of this nature, had been obtained by using very finely divided aluminum powder. According to the invention, however, this large surface is obtained by filling the tower with a much larger amount of relatively large size aluminum grains and shot. In the known processes, the total active surface was further increased by rotating the autoclave which required a relatively complicated mechanism and in particular prevented a continuous introduction of new aluminum as starting material into the autoclave; or, at least, complicated arrangements were required.

In the apparatus according to the invention, the reactor is stationary and, owing to the large size granules of aluminum which do not tend to form pastes, it is possible to circulate the liquid components, under pressure and the hydrogen in a perfectly continuous manner through the aluminum charge in the stationary device. The relatively simple arrangement of the entire installation together with the truly continuous nature of the process permit to achieve a very considerable and genuine reduction of the cost of producing organo-aluminum compounds.

Instead of carrying out the process according to the invention purely in gaseous phase, it is also possible according to another mode of operation to let the activation reaction, i.e., the formation of aluminum halide, take place in the liquid phase. For this purpose a suitable solvent for the halogen-containing substance is introduced through pipe 7 in the apparatus according to the invention. Suitable solvents are certain hydrocarbons and their derivatives, such as xylene, anisol, and probably also benzene, acetone, or pyridine. Solvents are preferred which have boiling points of about 140° C. and higher.

In the liquid phase the reaction between the aluminum and the halogen is much facilitated, so that the temperature during the formation of the aluminum halide can be room temperature or slightly higher. Halide formation sets in after a delay time of about 30 minutes required probably for penetrating the oxidic layer covering the aluminum particles.

The elimination of the formed halide can then be effected simply by raising the temperature to the vicinity of the boiling point of the solvent, i.e., to about preferably 120° to 130° C. At these temperatures the vapor pressures and/or solubilities of $AlCl_3$ and $AlBr_3$ and $AlI_3$ are already sufficiently high to allow speedy removal by sublimation or dissolution of these halides. The formation of $AlF_3$ does not appear recommendable since its removal by sublimation would require excessively high temperatures.

The advantages of both the easier halide formation in the liquid phase and the easier removal of the resulting halide in a gaseous phase at higher temperatures can be combined by first activating the aluminum particles by contact with a halogen-laden solvent at room temperature, and then removing the halide in an argon stream at a temperature of about 120° and even about 300° C. The valuable argon gas is thus required in much smaller quantities and, since it is practically free from halogen it can be recirculated after passing through simple cooling traps in which the solvent and eventual traces of the halide are held back. It must be borne in mind that the major portion of the aluminum halide is removed during the heating-up-period and while the solvents still circulate through column 2.

This invention will be further illustrated by a number of examples which are, however, not to be considered as limitative of the scope of the invention.

*Example I*

In a first operation, 6 kg. of aluminum shot of a purity of 99.5% and grain sizes between 0.1 and 1 mm. are filled into a hopper 1 and column 2, in an apparatus shown in the drawing.

A stream of argon is passed therethrough via inlet line 6 and outlet line 8, and the metal is then heated and kept at 450° C. Now a stream of argon containing 2% by volume of anhydrous HCl is passed through the shot charge via line 7. The flow rate of the gas is of 250 liters per hour. Aluminum chloride fumes soon appear at the outlet 8 and are condensed in the form of yellowish powder in a tubular extension or trap (not shown) which is cooled down to 20° C. After 3 hours the introduction of HCl is interrupted and the shot is allowed to cool in a stream of pure argon so as to eliminate the last traces of $AlCl_3$.

The activated shot is then transferred, still under an atmosphere of argon, into an autoclave (tower 3) containing one kg. of tri-isobutyl-aluminum. Then 4 kg. of isobutene are charged into the autoclave, and a partial pressure of 150 kg./cm.$^2$ of hydrogen is established. The temperature is maintained at 130° C.[1] The occurring absorption of hydrogen is allowed to proceed until an amount thereof corresponding to the formation of tri-isobutyl aluminum has been absorbed, which requires about 2½ hours. Now liquid is drawn off through outlet pipe located at the lower part of the autoclave forming a sump, while the metal is retained within the autoclave by a fine screen. In a further operation the autoclave is again charged with isobutene and hydrogen as during the first operation; the residual organo-aluminic compound which is still adherent on the surface of the shot grains is sufficient for priming the reaction of this second operation, so that no further catalyst need be added. The average production of crude tri-isobutyl aluminum is about 4.5 kg. per operation. The product contains about 5% dissolved isobutene. The metallic impurities of aluminum, freed by the dissolution of the shot, and suspended in the drawn off organo-aluminic compound, are eliminated by filtration. The operation cycle can be repeated about nine times without recharging aluminum into the autoclave. Although the amount of aluminum decreases towards the end of the operation, the velocity of reaction shows rather a tendency of increasing, probably because the reacting surface increases as the shot becomes finer.

*Example II*

A production similar to that of Example I is effected, but the absorption of hydrogen is continued during 3½ hours so as to obtain finally a mixture of 70% di-isobutyl aluminum hydride and 30% tri-isobutyl aluminum.

*Example III*

In an operation as that of Example I, chlorine is used instead of hydrochloric acid.

*Example IV*

The isobutene used in Example I is replaced by methyl-2-pentene-1, while the temperature of the autoclave is controlled so as to be at 140° C. Tri-hexyl aluminum is then obtained.

*Example V*

Example I is repeated but isobutene is replaced by tri-methyl-2,4,4-pentene-1. Tri-(trimethyl-2,4,4-pentyl-)aluminum is obtained.

*Example VI*

Into a pressure-resistant vertical steel tower 3 having a volume of 18 liters, 12 kg. of aluminum are charged,

[1] The liquid phase (reference 12 on the drawing) is circulated by means of pump 16, so as to be sprinkled at 18.

which have been activated by pretreatment with gaseous hydrochloric acid as in Example I. The charge is kept under an atmosphere of hydrogen under 140 kg./cm.$^2$ at 130° C. It is sprinkled from the top with tri-(trimethyl-2,4,4-pentyl-)aluminum by means of circulation pump 16 which takes up the liquid from the bottom of the tower at the rate of 50 liters per hour. The output of the sprinkling pump is such that the charge of aluminum is never submerged, so that there are always three phases present: solid, liquid and gas. As the reaction proceeds, the liquid phase would tend to become converted to di-(trimethyl-2,4,4-pentyl)-aluminum-hydride. In order to convert the dialkyl-aluminum-hydride formed to tri-alkyl-aluminum a just stoichiometrically sufficient amount of trimethyl-2,4,4-pentene-1 is continuously injected via (14) into the circuit (13—16—17) at a rate of about 5 liters per hour. The excess of tri-alkylaluminum thus obtained is removed continuously from the circulating liquid phase. From time to time activated aluminum is introduced at the top of tower 3 to reestablish the full charge. The rate of production of the organo-aluminic compound amounts to about 5 to 8 kg. per hour.

*Example VII*

In a plant as shown in the drawing, and comprising a tower-autoclave 3, the cylindrical column 2 is heated at 450° C. The aluminum shot coming from hopper 1 encounters within the column 2 a gaseous mixture of 98% argon with 2% anhydrous HCl. As the drawing shows, hydrochloric acid is injected somewhat above the heated region, so that through the lower part of chamber 2 pure argon streams upwardly and entrains the last traces of aluminum chloride vapors. Under the effect of gravity, the activated aluminum passes into sealing lock 4, which allows the shot to be introduced into the autoclave in small batches, i.e. practically in a continuous manner.

The other operating conditions and the production results are the same as in Example VI.

*Example VIII*

As in Example VI, a mixture of di-propyl-aluminum-hydride (30% by weight) and tri-propyl-aluminum (70%) is caused to circulate via 13—16—17 in the apparatus according to the invention and propylene is bled into the cycle via injection pump 14a so as to transform into tri-propyl-aluminium the excess of hydride which tends to form. The production of alkyl aluminum compounds amounts to 4 liters per hour at an operational temperature of 125° C. The resulting mixture is transformed into pure tri-propyl-aluminum by heating at 90° C. with an excess of propylene under pressure.

*Example IX*

While operating as in Example VIII the reagents of the example are replaced respectively by tri-ethyl-aluminum, di-ethyl-aluminum-hydride and ethylene. Similar satisfactory results are obtained.

*Example X*

The activation of aluminum shot of the type used in Example I is carried out in column 2 of the apparatus illustrated in the drawing, by passing through inlet 6 and upwardly and out through pipe 8 a stream of anisol while heating the column to a temperature of 40° C. A stream of gaseous HCl is then introduced through inlet 7 via a check valve (not shown) and acts on the oxidic layer of the aluminum shot in column 2 for about 3 hours. The HCl stream is then turned off and the anisol stream is continued while the temperature in column 2 is briefly raised to 140° C. All aluminum chloride formed after a delay of about 30 minutes from the beginning of the aforesaid 3 hours is thereby completely eliminated.

*Example XI*

Example X is repeated, but a stream of gaseous HBr is used instead of HCl used in the preceding example.

Example XII

Example X is repeated and activation is carried out in the solvent phase, using xylene instead of anisol. The elimination of aluminum chloride takes place by raising the temperature of the column to about 120° C.

Example XIII

Example I is repeated, but a stream of iodine and anhydrous hydroiodic acid in mixture with each other is admixed via pipe 7 with the argon stream entering through pipe 6.

Example XIV

Example X is repeated, but the elimination of all anisol vapors and possible residual AlCl₃ is effected by interrupting the anisol stream and passing pure argon through inlet pipe 6 as described in Example I. In this instance, it is preferred to carry out the operation batchwise, discharging a batch of activated aluminum shot into the reaction tower 3, interrupting the argon stream prior to the activation of fresh material dropping from hopper 1 into column 2 and repeating the treatment with HCl in the anisol phase at room temperature.

It will be understood that this invention is susceptible to further modification and, accordingly, it is desired to comprehend such modification within this invention as may fall within the scope of the appended claims.

We claim:

1. A process for preparing organo-aluminum compounds comprising the steps of treating commercially available small pieces of metallic aluminum with at least one activating agent selected from the group consisting of chlorine, bromine, iodine, anhydrous hydrochloric, hydrobromic and hydroiodic acids and organic compounds containing per molecule at least one labilely bonded halogen atom from the group consisting of chlorine, bromine and iodine, to form the corresponding aluminum halide on the surfaces of the aluminum pieces; vaporizing the formed aluminum halide and entraining the aluminum halide vapors in a stream of a fluid inert against the reactants present so as to completely eliminate the aluminum halide from the mass of the aluminum pieces, and reacting the resulting halogen-free activated aluminum pieces with an olefin and hydrogen to obtain a determined organo-aluminum compound.

2. In a process for preparing organo-aluminum compounds wherein small pieces of metallic aluminum are reacted with an olefin and hydrogen to obtain a predetermined organo-aluminum compounds, the improvement which comprises activating the aluminum precedent to said reaction by, the steps of treating commercially available small pieces of metallic aluminum with at least one activating agent selected from the group consisting of chlorine, bromine, iodine, anhydrous hydrochloric, hydrobromic and hydroiodic acids and organic compounds containing per molecule at least one labilely bonded halogen atom from the group consisting of chlorine, bromine and iodine, to form the corresponding aluminum halide on the surfaces of the aluminum pieces; vaporizing the formed aluminum halide and entraining the aluminum halide vapors in the streams of a fluid inert against the reactants present so as to completely eliminate the aluminum halide from the mass of the aluminum pieces.

3. The process steps described in claim 2, characterized in that said activating agent is gaseous elementary chlorine.

4. The process steps described in claim 2 characterized in that said activating agent is anhydrous hydrochloric acid.

5. The process steps described in claim 2, characterized in that said activating agent is tetrachloroethane.

6. The process steps described in claim 2, characterized in that said activating agent is tetrabromoethane.

7. The process steps described in claim 2, characterized in that said activating agent is in a gaseous anhydrous state.

8. The process steps described in claim 2, characterized in that said activating agent is entrained in said inert fluid.

9. The process steps described in claim 2, characterized in that the formation of the aluminum halide and the elimination of the latter from the aluminum pieces are effected simultaneously while the aluminum pieces are heated to a temperature in the range of 300 to 550° C.

10. The process steps described in claim 2, characterized in that the formation of the aluminum halide is effected with the aid of a solution of said activating agent in said inert fluid being a liquid solvent while the aluminum pieces being attacked by the solution are at a temperature from equal to slightly higher than room temperature.

11. The process steps described in claim 2, characterized in that the formation of the aluminum halide is effected with the aid of a solution of said activating agent in said inert fluid being a liquid solvent, while the aluminum pieces being attacked by the solution are at a temperature from equal to slightly higher than room temperature; and that the elimination of the aluminum halide from the activated aluminum pieces is effected by subsequently passing the solvent alone past the aluminum pieces while raising the temperature of the latter sufficiently high to attain a noticeable vapor pressure of the aluminum halide, but remaining below the boiling point of the solvent.

12. The process steps described in claim 2, characterized in that the formation of the aluminum halide is effected with the aid of a solution of said activating agent in said inert fluid being a liquid solvent, while the aluminum pieces being attacked by the solution are at a temperature from equal to slightly higher than room temperature; interrupting contact of said solution with the aluminum pieces; and passing a stream of said inert fluid in the gaseous phase past the aluminum pieces while raising the temperature of the latter to between about 300 to 550° C. so as to eliminate completely the aluminum halide and solution from the activated aluminum pieces.

13. The process steps described in claim 2, characterized in that said inert fluid is a solvent for said activating agent.

14. The process steps described in claim 2, characterized in that said inert fluid is anisol.

15. The process steps described in claim 2, characterized in that said inert fluid is xylene.

16. The process steps described in claim 2, characterized in that said inert fluid is in the gaseous phase.

17. The process steps described in claim 2, characterized in that said inert fluid is argon.

18. The process steps described in claim 2, characterized in that said stream of inert fluid is passed over said aluminum pieces together with said activating agent, both said fluid and said activating agent being in the gaseous phase and the former diluting the latter so as to obtain a uniform and evenly progressing attack of said activating agent on said aluminum pieces, in combination with the step of controlling the concentration of said activating agent in said inert fluid so as to control said attack.

19. A process for preparing organo-aluminum compounds, comprising the steps of: treating metallic aluminum commercially available in small pieces with at least one halogen containing substance, at least part of the halogen atoms of which are capable of reacting with said commercial aluminum to form the corresponding aluminum halide on the surfaces of the aluminum pieces, separating the residual activated aluminum metal from the formed aluminum halide by vaporizing said halide in an atmosphere inert to both the halide and the activated aluminum, and reacting the resulting halogen-free activated aluminum pieces with an olefin and hydrogen to obtain a determined organo-aluminum compound.

20. The process described in claim 19, characterized in that said commercially available aluminum consists of aluminum shot, having grain sizes between 0.1 and 1 millimeter.

UNITED STATES PATENTS
FOREIGN PATENTS

| | | |
|---|---|---|
| 351,184 | Mabery | Oct. 19, 1886 |
| 1,564,302 | Wohlers | Dec. 8, 1925 |
| 1,793,935 | Kaufler et al. | Feb. 24, 1931 |
| 2,439,737 | Houston et al. | Apr. 13, 1948 |
| 2,697,030 | Haufe et al. | Dec. 14, 1954 |
| 2,768,070 | Brazaitis | Oct. 23, 1956 |
| 2,787,626 | Redman | Apr. 2, 1957 |
| 2,858,195 | Vieli | Oct. 28, 1958 |
| 2,863,894 | Smith | Dec. 9, 1958 |
| 2,892,738 | Dobratz | June 30, 1959 |

FOREIGN PATENTS

| | | |
|---|---|---|
| 1,122,000 | France | May 14, 1956 |